US007708505B2

(12) United States Patent
Opsitos, Jr. et al.

(10) Patent No.: US 7,708,505 B2
(45) Date of Patent: May 4, 2010

(54) JOIST DRILL

(75) Inventors: Robert J. Opsitos, Jr., Felton, PA (US); Christopher R. Held, Abbottstown, PA (US); Robert S. Gehret, Hampstead, MD (US); Richard J. Heavel, Hanover, PA (US); Daniel Puzio, Baltimore, MD (US); Craig A. Schell, Street, MD (US); Larry T. Albert, Abingdon, MD (US); Thomas J. Bodine, Glenwood, MD (US); Daniel L. Gregory, Monkton, MD (US)

(73) Assignee: Black & Decker Inc., Newark, DE (US)

( * ) Notice: Subject to any disclaimer, the term of this patent is extended or adjusted under 35 U.S.C. 154(b) by 232 days.

(21) Appl. No.: 11/868,012

(22) Filed: Oct. 5, 2007

(65) Prior Publication Data

US 2009/0145520 A1    Jun. 11, 2009

Related U.S. Application Data

(60) Provisional application No. 60/850,095, filed on Oct. 6, 2006.

(51) Int. Cl.
*B23B 45/14*    (2006.01)
(52) U.S. Cl. .................. 408/1 R; 408/112; 408/124; 408/136; 408/241 G
(58) Field of Classification Search ............ 408/1 R, 408/110–112, 124, 136, 137, 141, 712, 241 G; 173/44–45, 141, 144, 148, 151, 184
See application file for complete search history.

(56) References Cited

U.S. PATENT DOCUMENTS 443,766 A    12/1890    Horan (Continued)

FOREIGN PATENT DOCUMENTS

DE    3046235 A1 *    7/1982

(Continued)

*Primary Examiner*—Daniel W Howell
(74) *Attorney, Agent, or Firm*—Harness, Dickey & Pierce, P.L.C.

(57) ABSTRACT

A power tool for drilling a hole in a workpiece made of wood or a wood material. The power tool generally includes a tool housing defining a handle and a motor contained within the tool housing that includes an output shaft that spins about a motor axis. A gear housing is connected to the tool housing. An output spindle is supported for rotation about a spindle axis in the gear housing. The spindle axis is disposed about ninety degrees from the motor axis. A gear portion on the output shaft is engaged to a gear portion on the output spindle. The motor and the gear portions are configured to rotate the output spindle at a speed in range from about five thousand revolutions per minute to about twenty-five thousand revolutions per minute. A cutting member is connected to the output spindle. The cutting member includes fluted cutting blades. A carriage assembly includes a base member and a head member connected by a first post having a first compliant member and a second post. The head member slides relative to the first and second posts and against a force exerted by the first compliant member when the head member is moved toward the base member to pass the cutting member through the base member to engage the workpiece. The base member includes a generally planar face on a bottom surface of the base member that is generally perpendicular to the spindle axis.

17 Claims, 13 Drawing Sheets

U.S. PATENT DOCUMENTS

| | | | |
|---|---|---|---|
| 445,539 A | 2/1891 | Campbell et al. | |
| 996,612 A | 7/1911 | Caldwell | |
| 1,114,373 A | 10/1914 | Lane | |
| 1,434,946 A | 11/1922 | Fiorillo | |
| 2,291,729 A | 8/1942 | Koett | |
| 2,831,376 A | 4/1958 | Daniels | |
| 2,849,900 A | 9/1958 | Heidtman, Jr. | |
| 2,925,600 A | 2/1960 | Pfaff et al. | |
| 2,925,747 A * | 2/1960 | Armitage et al. | 408/64 |
| 2,940,367 A | 6/1960 | Cogsdill | |
| 3,244,030 A | 4/1966 | Godfrey | |
| 3,491,809 A | 1/1970 | Schneider | |
| 3,791,660 A | 2/1974 | Bostley | |
| 4,124,327 A * | 11/1978 | Yoshida et al. | 408/140 |
| 4,136,579 A | 1/1979 | Robinson et al. | |
| 4,349,301 A | 9/1982 | Boyajian | |
| 4,540,319 A | 9/1985 | Michiharu | |
| 4,572,715 A | 2/1986 | Wolff | |
| 4,582,456 A | 4/1986 | Imai | |
| 4,660,841 A | 4/1987 | Chouinard | |
| 4,669,929 A | 6/1987 | Olesen | |
| 4,753,556 A | 6/1988 | Solko | |
| 4,917,549 A * | 4/1990 | Geernaert | 408/42 |
| 4,968,193 A | 11/1990 | Chaconas et al. | |
| 4,995,768 A | 2/1991 | Craft | |
| 5,006,022 A | 4/1991 | Miller | |
| 5,062,749 A | 11/1991 | Sheets | |
| 5,160,231 A | 11/1992 | Miller | |
| 5,165,827 A | 11/1992 | Miller | |
| 5,238,336 A | 8/1993 | Sanders et al. | |
| 5,317,838 A | 6/1994 | Bourner | |
| 5,347,765 A | 9/1994 | Mixon, Jr. | |
| 5,348,428 A | 9/1994 | Turner | |
| 5,352,070 A | 10/1994 | Tehrani | |
| 5,398,946 A | 3/1995 | Quiring | |
| 5,405,221 A | 4/1995 | Ducker, III et al. | |
| 5,445,480 A | 8/1995 | Merriman | |
| 5,713,702 A | 2/1998 | Turner | |
| 5,885,036 A | 3/1999 | Wheeler | |
| 6,007,278 A * | 12/1999 | Arsenault | 408/79 |
| 6,264,406 B1 | 7/2001 | Bowles et al. | |
| 6,296,427 B1 | 10/2001 | Potter et al. | |
| 6,375,395 B1 | 4/2002 | Heintzeman | |
| 6,494,650 B2 | 12/2002 | Maecker | |
| 6,758,731 B2 | 7/2004 | Dutterer et al. | |
| 6,860,682 B1 | 3/2005 | LePicq | |
| 6,986,209 B2 | 1/2006 | Cook | |
| 7,194,812 B2 | 3/2007 | Davis | |
| 7,204,324 B2 | 4/2007 | Gleitman et al. | |
| 7,226,252 B2 | 6/2007 | Glodowski | |
| 7,270,591 B2 | 9/2007 | Deshpande et al. | |
| 2003/0037450 A1 | 2/2003 | Reed | |
| 2005/0105980 A1 | 5/2005 | Davis | |
| 2005/0116673 A1 | 6/2005 | Carl et al. | |

FOREIGN PATENT DOCUMENTS

| | | |
|---|---|---|
| GB | 2 350 084 A | 11/2000 |
| JP | 07-009222 | 1/1995 |
| JP | 07-051913 | 2/1995 |
| JP | 8 252706 A | 10/1996 |

* cited by examiner

US 7,708,505 B2

JOIST DRILL

CROSS-REFERENCE TO RELATED APPLICATIONS

This application claims the benefit of U.S. Provisional Application No. 60/850,095, filed on Oct. 6, 2006. The disclosure of the above application is hereby incorporated by reference.

FIELD

The present teachings relate to a wood cutting drill and more particularly relate to a joist drill having an output spindle rotating at a speed optimized to drill multiple holes that are less than one inch through stud lumber especially for pulling electrical wire and plumbing material.

BACKGROUND

Typically, professionals use a drilling tool to create holes in stud lumber used to frame buildings. By creating holes in the studs, the professionals are able to run electrical wire and plumbing materials through the studs. The holes for the electrical wire and plumbing materials are typically no larger than seven-eighths of an inch. Nevertheless, the drilling tool typically used to create the holes can be capable of creating more than the needed torque to cut such a hole.

The capability to provide torque, even if unused, can require that the drilling tool have a relatively large motor and/or complex transmission that can lead to an increase in the size of the drilling tool. As the studs are generally arranged in a wall at sixteen inches on center, there can be limited room between two studs for placement of the drilling tool. In addition, the additional torque can make the drilling tool cumbersome to hold while drilling, as the user must resist the rotation of the drilling tool.

SUMMARY

The present teachings generally include a power tool for drilling a hole in a workpiece made of wood or a wood material. The power tool includes a tool housing defining a handle and a motor contained within the tool housing that includes an output shaft that spins about a motor axis. A gear housing is connected to the tool housing. An output spindle is supported for rotation about a spindle axis in the gear housing. The spindle axis is disposed about ninety degrees from the motor axis. A gear portion on the output shaft is engaged to a gear portion on the output spindle. The motor and the gear portions are configured to rotate the output spindle at a speed in a range from about five thousand revolutions per minute to about twenty-five thousand revolutions per minute. A cutting member is connected to the output spindle. The cutting member includes fluted cutting blades. A carriage assembly includes a base member and a head member connected by a first post having a first compliant member and a second post. The head member slides relative to the first and second posts and against a force exerted by the first compliant member when the head member is moved toward the base member to pass the cutting member through the base member to engage the workpiece. The base member includes a generally planar face on a bottom surface of the base member that is generally perpendicular to the spindle axis.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
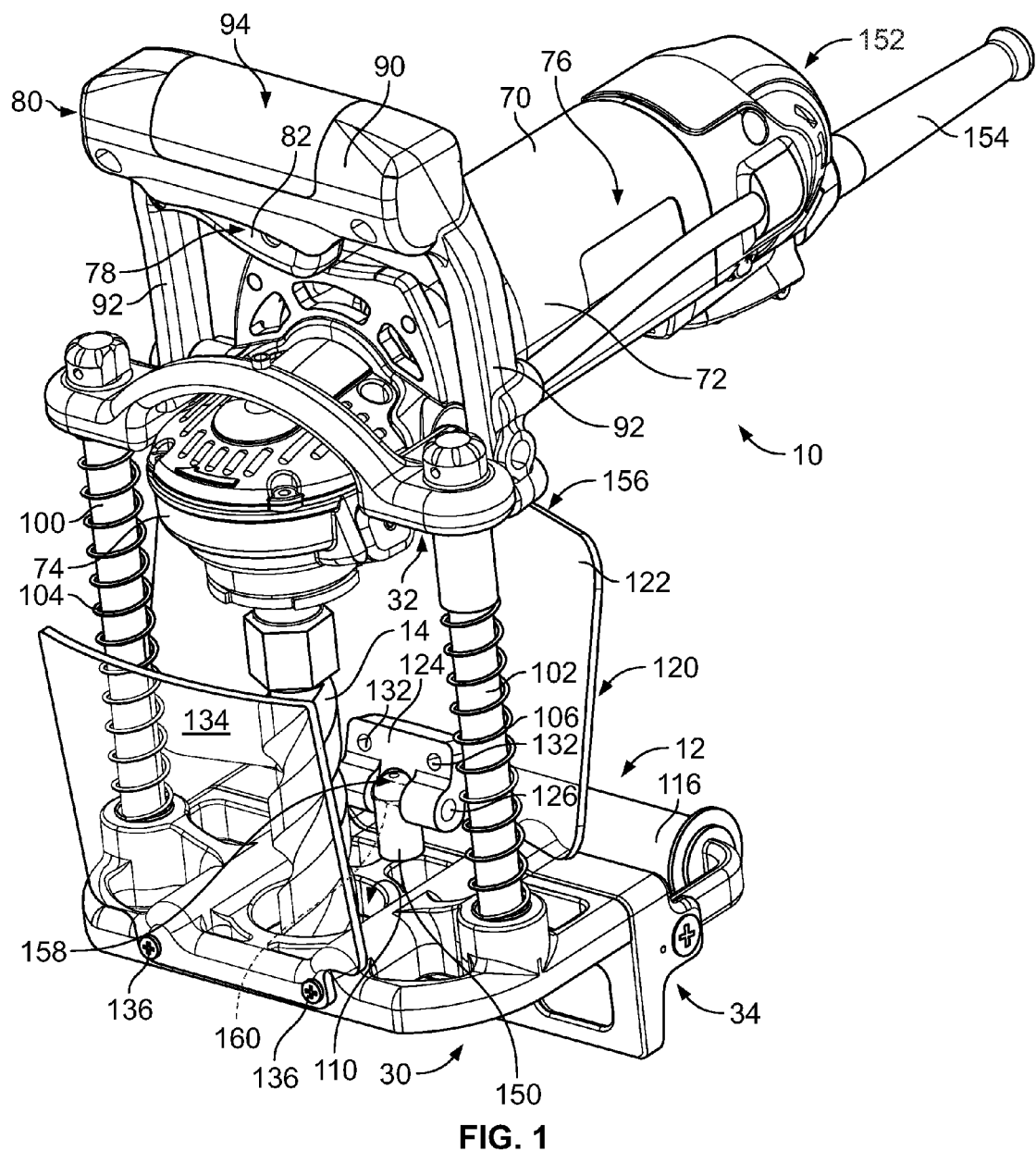
FIG. 1 is a perspective view of a joist drill in accordance with the present teachings.

The following description is merely exemplary in nature and is not intended to limit the present teachings, their application or uses. It should be understood that throughout the drawings, corresponding reference numerals indicate like or corresponding parts and features.

Figure 2:
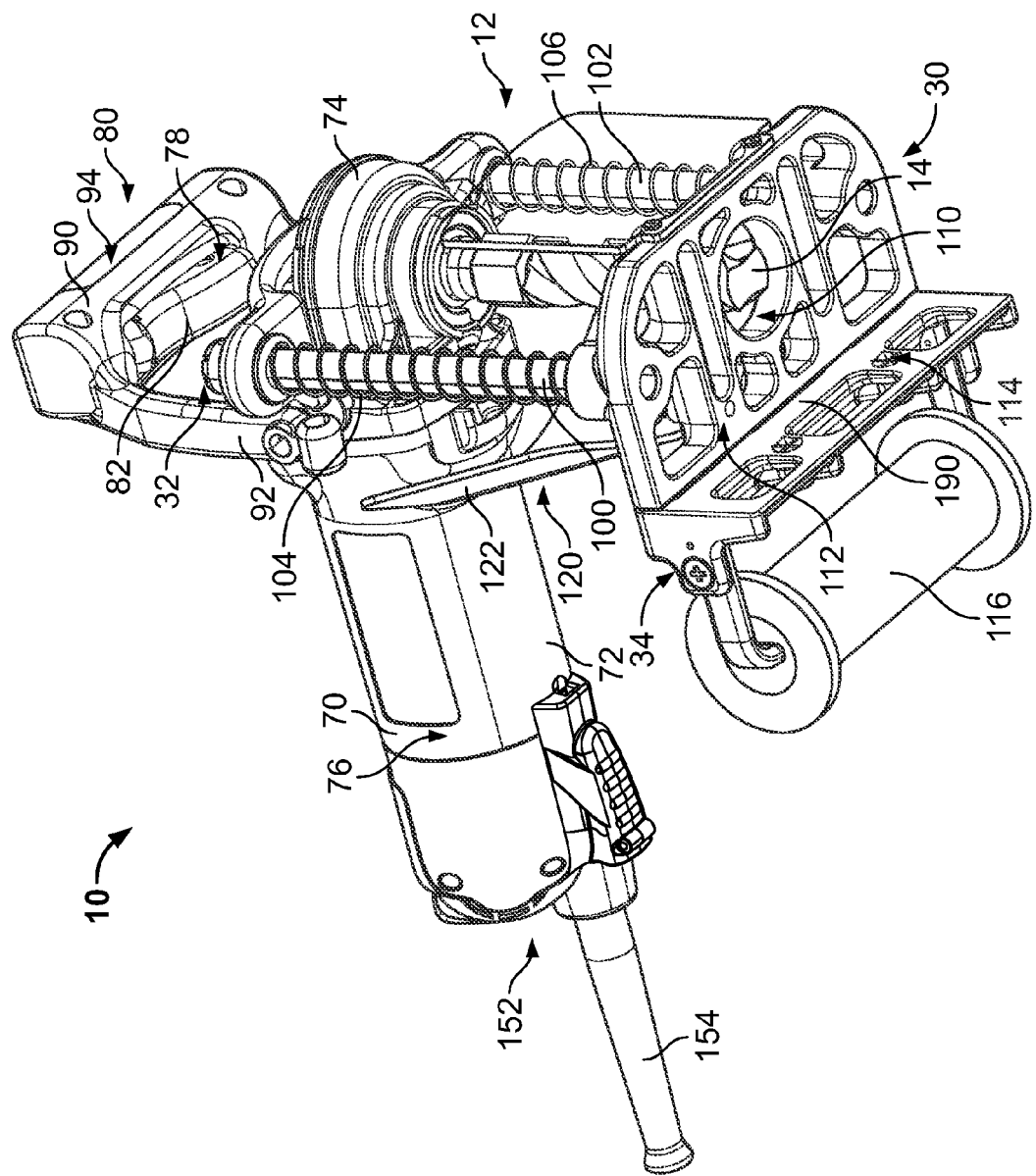
FIG. 2 is a further perspective view of the joist drill of FIG. 1.

With reference to FIGS. 1 and 2, a joist drill 10 can attach to a carriage assembly 12 to drive a fluted cutting member 14 through a workpiece 16 (FIG. 3) such as stud lumber to form one or more holes 18 (FIG. 4) therein. The one or more holes 18 can be configured to pass electrical wire or plumbing material through the stud lumber or other workpieces as needed. The joist drill 10 can be optimized so that the holes 18 can be made on multiple studs so that electrical wire, plumbing materials, etc, can be passed through multiple studs, especially for large scale installation projects.

The carriage assembly 12 can have a base member 30 that can abut the workpiece 16 and a head member 32 that can connect to the joist drill 10. While being held by the head member 32, the joist drill 10 can be moved toward the base member 30 to advance the fluted cutting member 14 through the base member 30 and into the stud. A fence member 34 can be movably connected to the base member 30 and can abut the stud to position (and re-position) the carriage assembly 12 and the joist drill 10 at a certain position on one or more of the studs.

Figure 10:
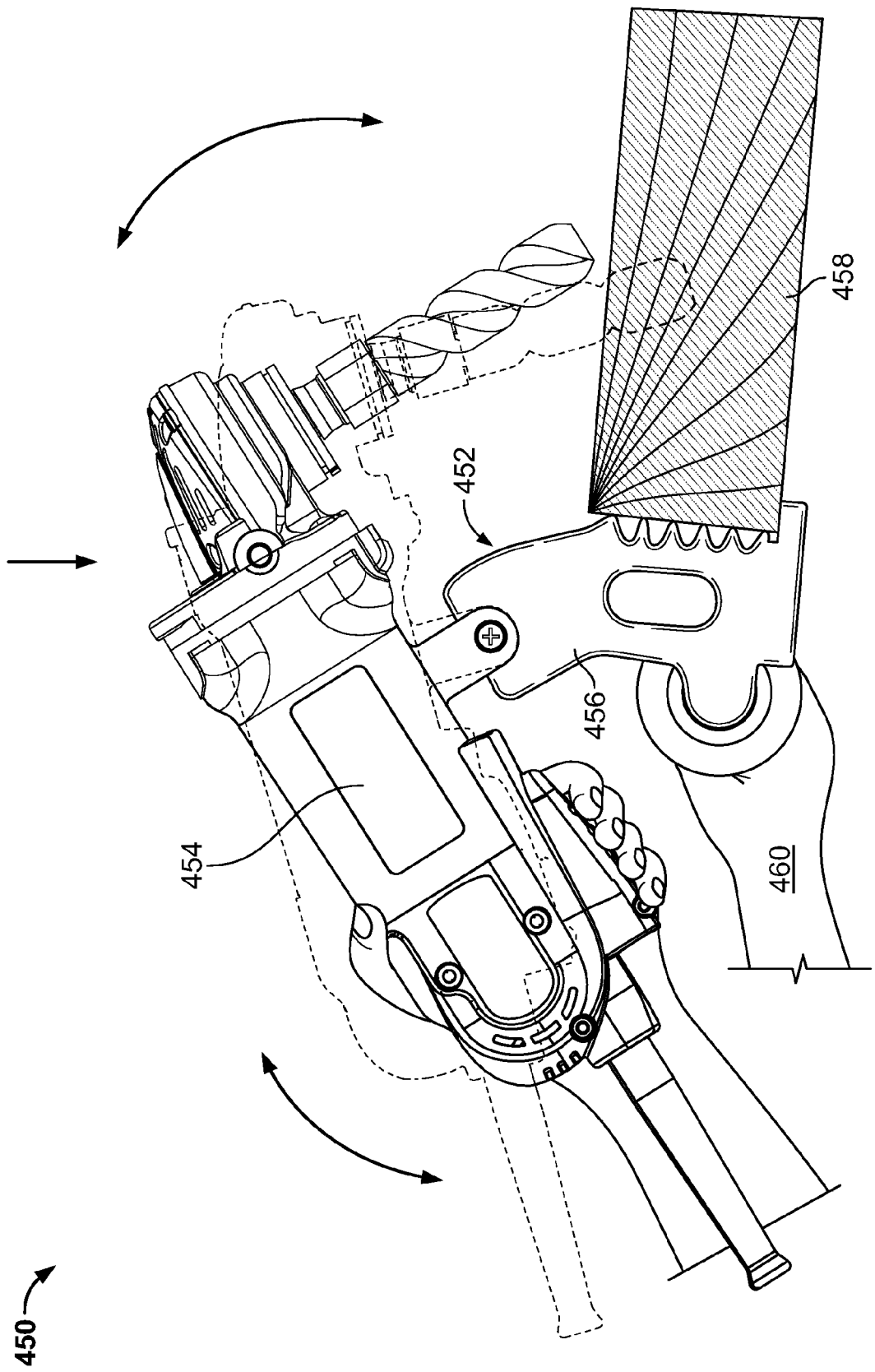
FIG. 10 is a diagram of a joist drill attached to a fence with a pivot so that the user can pivot the joist drill about the fence to engage the cutting member with the workpiece in accordance with the present teachings.

With reference to FIG. 10, a diagram of the joist drill 10 can be shown with a motor 40 that can drive an output shaft 42. The output shaft 42 can connect at an angle 44 that forms a right angle to an output spindle 46. The output spindle 46 can connect to the fluted cutting member 14 with a coupling mechanism 48. As such, the motor 40 can drive the output spindle 46, and thus the fluted cutting member 14, at a predetermined rotational speed. More specifically, the output spindle 46 can have a gear portion 50 that meshes with a gear portion 52 on the output shaft 42 to establish, for example, a bevel gear arrangement. It will be appreciated in light of the disclosure that other arrangements are possible such as direct drive, belt drive, chain drive, etc.

The output shaft 42 can spin about a motor axis 54 and the output spindle 46 can spin about a spindle axis 56. The motor 40 can be activated by a trigger assembly 58 via a power module 60. The rotational speed of the output spindle 46 can be a function of the rotational speed of the output shaft 42 and the configuration of each of the gear portions 50, 52. It will be appreciated in light of the disclosure that regardless of the connection arrangements between the output shaft and the output spindle, the fluted cutting member can be rotated at the desired rotational speed.

The joist drill 10 can be optimized to drill multiple holes 18 (FIG. 4) in stud lumber (or other wood material, workpieces, etc.) that can be used to frame buildings. With that said, the joist drill 10 can be optimized to drill multiple holes 18 that are less than one inch (less than about 25.4 millimeters) in diameter in the stud lumber. In doing so, the joist drill 10 can implement an optimized value of the rotational speed of the output spindle 46 that can be in a range from about five thousand revolutions per minute to about twenty-five thousand revolutions per minute depending on, among other things, the fluted cutting member 14 being employed.

The relatively high value of the rotational speed of the cutting member 14 relative to typical drilling tools for such an application can permit implementation of a relatively high feed rate for the fluted cutting member 14 employed to drill holes 18. It will be appreciated in light of the disclosure that as the diameter of the hole needed increases, the diameter of the fluted cutting member used to form the hole increases and the rotational speed of the output spindle used to drive the fluted cutting member decreases. Nevertheless, an increase in rotational speed means that more material is removed from the workpiece 16 but rotational speed is limited by, among other things, friction of the fluted cutting member 14 that can, at very high speeds, burn the lumber. With that said, the fluted cutting member removes relatively less material per revolution of the cutting edges compared to other tools using the same cutting member so the relatively high rotational speeds of the output spindle, discussed throughout, can be implemented.

The fluted cutting member 14 can be a twist drill, an end mill, a spiral up-cut bit or any such drill bit that can cut material from the lumber at the above disclosed range of rotational speeds of the cutting member 14. In addition, the fluted cutting member 14 can have an additional chamfer or radius implemented on an end portion of the fluted cutting member 14. The additional chamfer or radius cutter can provide a lead-in formed around the hole. This lead-in around the hole can facilitate the pulling of wire, as the lead-in can reduce the propensity of binding and/or damage to whatever is being pulled through the hole relative to a square edged hole.

Figure 4:
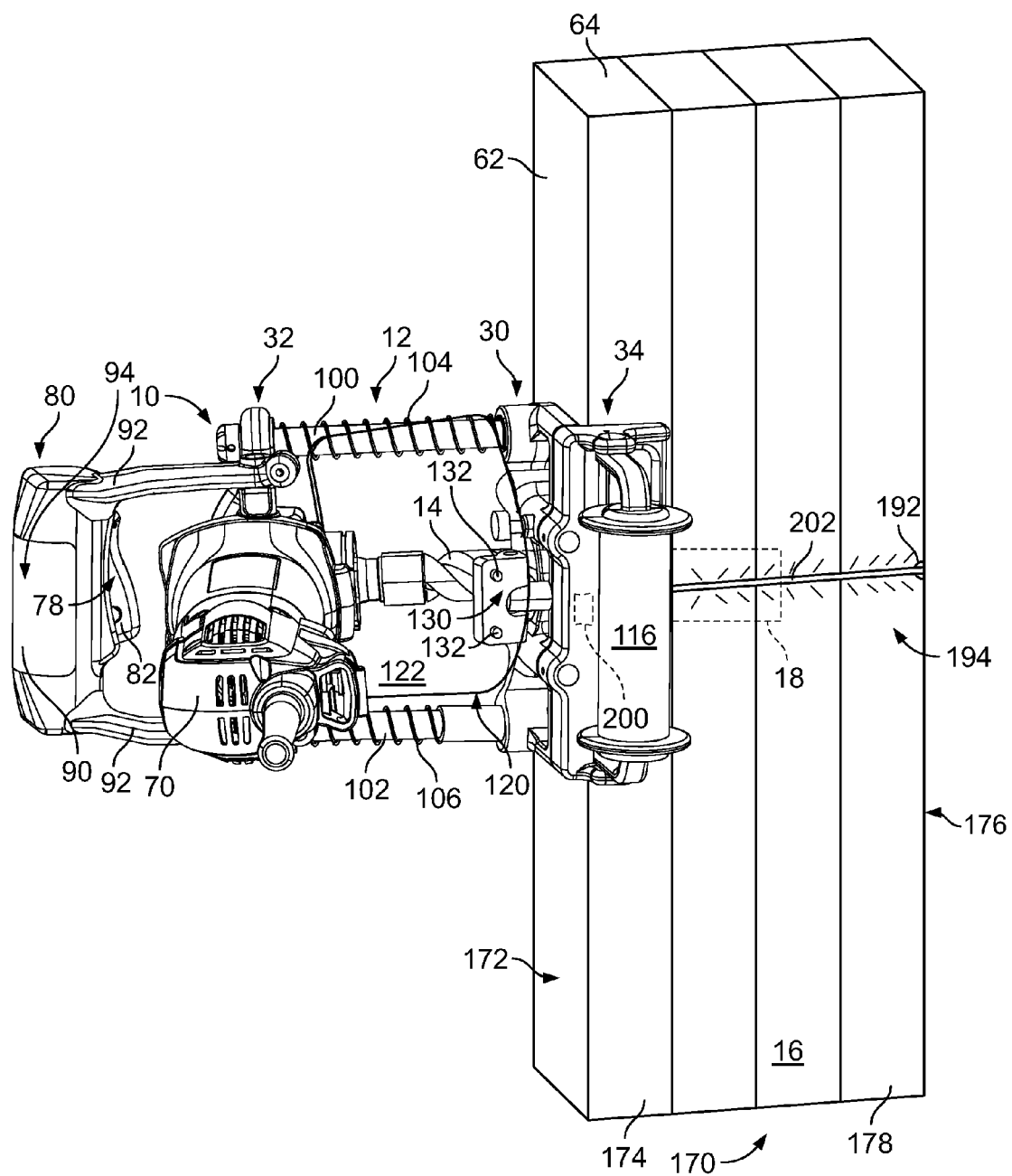
FIG. 4 is a perspective view of the joist drill of FIG. 1 attached to an exemplary workpiece of stacked stud lumber and showing a laser alignment mark for drilling a hole through the stack of stud lumber in accordance with the present teachings.

With reference to FIG. 4, the joist drill 10 can be positioned to cut a face 62 of a stud 64. In one example, the stud 64 is a 2×4 and the base member 30 of the carriage assembly 12 can be secured to the stud so that the joist drill 10 can cut the hole 18 through the center of a face 62 of the stud 64. The hole 18 can be formed on the face 62 having a three and one half inch dimension when using the 2×4 stud lumber.

The fence member 34 can be moved relative to the base member 30 to position the joist drill 10 at the same location to form the hole 18 in the center of the face 62 or other predetermined location on the stud 64. The fence member 34 can be moved and/or the base member 30 can be configured so that the joist drill 10 can cut holes 18 at predetermined locations on various dimensional lumber (e.g., 2×6, 2×8, 2×10, etc.). In this regard, the positions of the fence member can correspond to certain sizes of the dimensional lumber.

The carriage assembly 12 can be configured so that the joist drill 10 can be moved from one similarly sized stud to another and the hole 18 can be made in the same place on the face 62 of each stud, so that electrical wire and plumbing material can easily be routed through multiple studs, especially in large installation projects. For example, the user can run electrical wire through a ceiling where the studs (joists) are about sixteen inches on center and the joists are 2×8 dimensional lumber. The carriage assembly 12 can be configured so that the fence member 34 abuts a face 62 while the base member 30 abuts the face 62. The face 62 can be on an adjacent face of the stud lumber having the one and one half inch dimension face in the 2×8 example.

In addition, the carriage assembly 12 can be configured so that the cutting member 14 can create a hole 18 in the center of each of the faces 64 or any other suitable location. It will be appreciated that the joist drill 10 can permit the user to quickly move from joist to joist and create the similarly located holes 18 quickly with a relatively lighter tool. The joist drill 10 can be shown to fit between the joists and provide relatively less rotational force (i.e., kick) that the user has to resist while using the joist drill 10.

Figure 5:
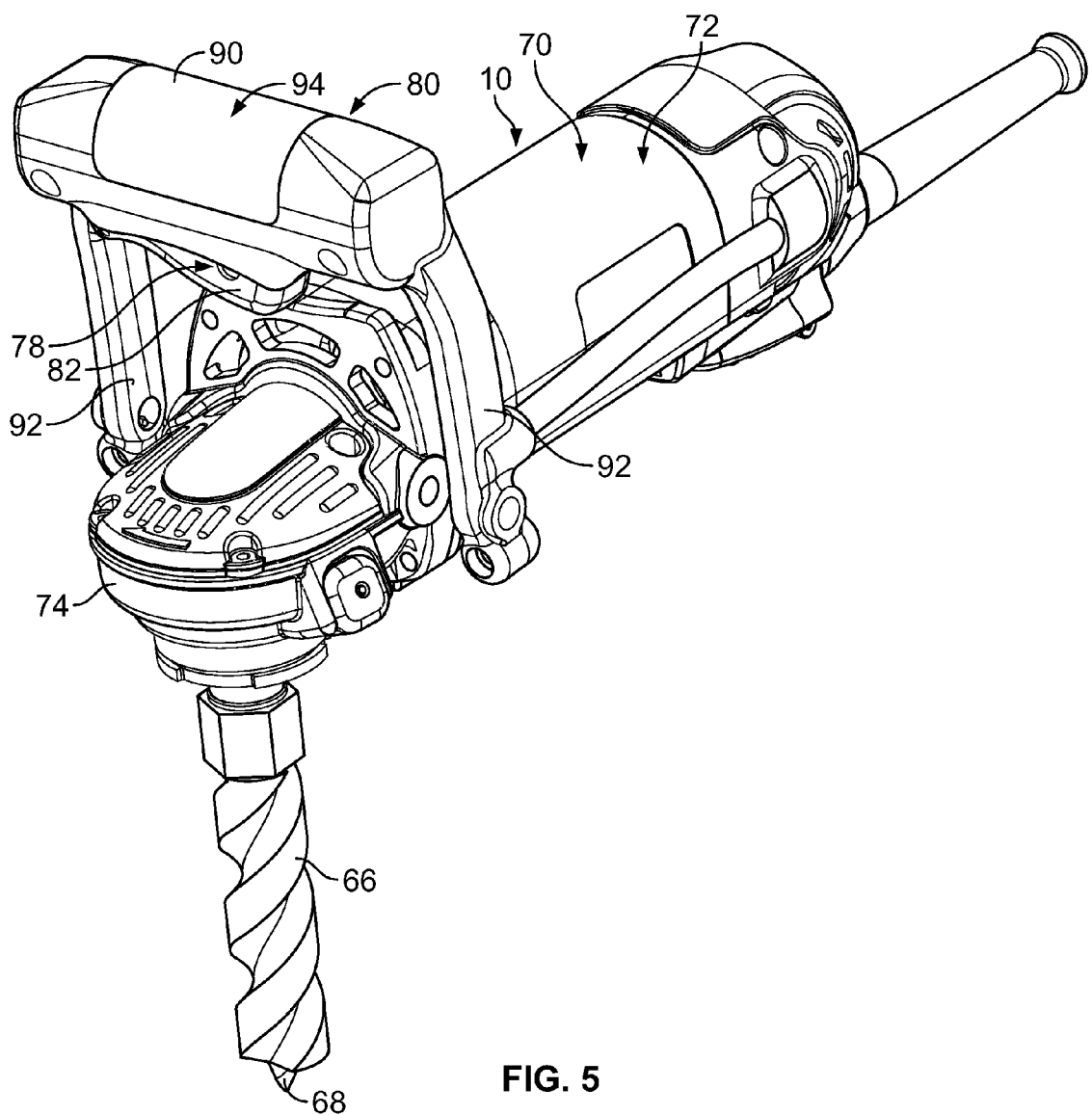
FIG. 5 is a perspective view of a joist drill in accordance with the present teachings.

With reference to FIG. 5, the joist drill 10 can be implemented without the carriage assembly 12. In addition, the joist drill 10 can be used with a cutting member 66 which is similar to the cutting member 14 but includes a further self starting cutting tip 68 that extends from an end of the cutting member 66. The joist drill 10, as shown in FIG. 5, can be oriented and driven through the stud by the user, in contrast to the joist drill 10, as shown in FIG. 1, that relies on the carriage assembly 12 to maintain orientation of joist drill 10.

With reference to FIGS. 1 and 2, the joist drill 10 can include a housing 70 that can include a motor housing 72 and a gear housing 74 each of which can be formed of multiple housing portions or can be formed of a single housing piece of material. In one example, the motor housing 72 can be made of plastic and the gear housing 74 can be made of metal such as cast aluminum.

The motor housing 72 can define a handle 76 that the user can hold while operating the joist drill 10. In addition, a trigger assembly 78 can be connected to the housing 70 so that the user can access the trigger assembly 78 while holding the handle 76. In this example, the trigger assembly 78 can be provided on an accessory handle 80. In other examples, the trigger assembly 78 can be provided on the housing 70 in addition to or in lieu of its position on the accessory handle 80. Regardless of the location of the trigger assembly 78, the user can retract a trigger 82 of the trigger assembly 78 to send a signal to a power module 60 (FIG. 10) to activate the motor 40.

The accessory handle 80 can define a bar member 90 from which two leg members 92 can extend and connect to the gear housing 74. The trigger assembly 78 can be positioned on the bar member 90. The bar member 90 can also define a handle portion 94. The handle portion 94 can include the trigger assembly 78 so as to be reached by user.

The accessory handle 80 can be configured so the handle portion 94 is disposed above the gear housing 74. When a force is applied to the accessory handle 80 by the user to move the joist drill 10 in the carriage assembly 12 toward the base member 30, the force is applied on the handle portion 94 and can generally be directly above the gear housing 74. The position above the gear housing 74 allows the user to push the fluted cutting member 14 of the joist drill 10 into engagement with the stud from a position that is above the fluted cutting member 14 rather than a position at an end 152 of the housing near a cord protector 154.

In one example, the trigger assembly 78 on the housing and/or on the accessory handle 80 can be omitted (or bypassed). In this example, the motor 40 can be activated based on a degree of travel as the joist drill 10 in the carriage assembly 12 travels from the extended condition to the retracted condition. At a predetermined point in the above travel, the motor 40 can be activated to begin rotating the fluted cutting member 14. In this regard, the accessory handle 80 can be omitted and the size of the joist drill 10 can be further reduced to, for example, fit between non-standard ceiling joist arrangements.

In the above example, the motor 40 can be activated by one or more micro switches, linear displacement sensors, proximity sensors such as hall sensors, magnetic sensors and/or motion sensors and/or one or more combinations thereof. In lieu of (or in addition to) switches and/or sensors, a mechanical linkage can be implemented to actuate a trigger that can activate the motor 40 to drive the fluted cutting member 14.

The carriage assembly 12 can include a first post 100 and a second post 102 that each extend from the base member 30 and connect to the head member 32 so that the head member 32 can slide relative to the first and the second posts 100, 102. It will be appreciated in light of the disclosure that members, rods, linkages, etc. of various configurations can be used in lieu of or in addition to the posts 100, 102.

A first compliant member 104 can be associated with the first post 100 and a second compliant member 106 can be associated with the second post 102. The first and second compliant members 104, 106 can bias the base member 30 away from the head member 32 so that the carriage assembly 12 remains in the extended condition. The head member 32 and ultimately the joist drill 10 can be moved toward the base member 30 against the bias of the compliant members 104, 106.

In one example, the compliant members 104, 106 can each be springs that can be compressed when the carriage assembly 12 is moved to the retracted condition. From the retracted condition, the springs can urge the head member 32 away from the base member 30 and move the carriage assembly 12 back to the extended condition. In this condition, the springs can be less compressed or need not be compressed at all. As such, the springs can be implemented in a compressed state in both the extended and retracted condition but in the retracted condition the springs can be compressed more than in the extended condition.

With reference to FIG. 2, the base member 30 can define an aperture 110 through which the fluted cutting member 14 can pass or be disposed as the carriage assembly 12 is moved from the extended condition to the retracted condition. On a face 112 of the base member 30 that contacts the stud, additional temporary fasteners 114 can extend from the face 112 and can be connected to the stud when mounted thereto. The additional fasteners 114 can include spikes, burrs, etc. to catch and hold the stud. The fence member 34 can (or need not) include the additional fasteners 114 so the fence member 34 can temporarily secure to the stud.

With reference to FIGS. 1 and 2, a carriage handle 116 can extend from the fence member 34 so that the user can hold both the carriage handle 116 and the accessory handle 80 or the handle 76 formed of the housing 70. It will be appreciated in light of the disclosure that the fence member 34 can be fixed or movable relative to the base member 30. The carriage handle 116 can extend from the fence member 34 or the base member 30.

In operation, the user holding the accessory handle 80 and/or the carriage handle 116 can provide pressure to maintain the base member 30 and the fence member 34 in contact with the stud. The trigger 82 is then retracted to start the motor 40 and the user moves the joist drill 10 toward the base member 30 and thus the fluted cutting member 14 toward the stud. The user can continue to apply the force to urge the joist drill 10 toward the base member 30 until, among other things, the fluted cutting member 14 breaks through the other side of the stud. In this regard, it can be shown that the force needed to keep the fluted cutting member 14 in cutting contact with the stud is lower when compared to conventional methods having relatively low rotational speeds and higher valves of torque at the fluted cutting member 14.

The connection mechanism 48 that can connect the fluted cutting member 14 to the output spindle 46 can be any suitable connection mechanism such as, but not limited to, a multi-jaw chuck, a hex shank chuck, a router-style collet, etc. In addition, while a fluted cutting member that provides the desired final size of the hole 18 can be used, a cutting member (fluted or otherwise) with a smaller diameter than the desired diameter of the hole 18 can be used. In this regard, the fluted cutting member 14 can move in an orbital and/or translating motion to produce the desired diameter of the hole 18 rather than just drilling a hole at the final desired size.

In one example, the coupling mechanism 48 can define a Morse taper. More specifically, a cutting member and a portion of the output spindle 46 can be configured with self-locking and matching tapers to provide a relatively low profile coupling mechanism 48. In one example, a bar (not shown) can be used to pull the fluted cutting member 14 into a locking engagement with the output spindle 46 to impart the necessary axial loading to ensure the fluted cutting member 14 is secured to the output spindle 46 using the Morse taper.

Figure 3:
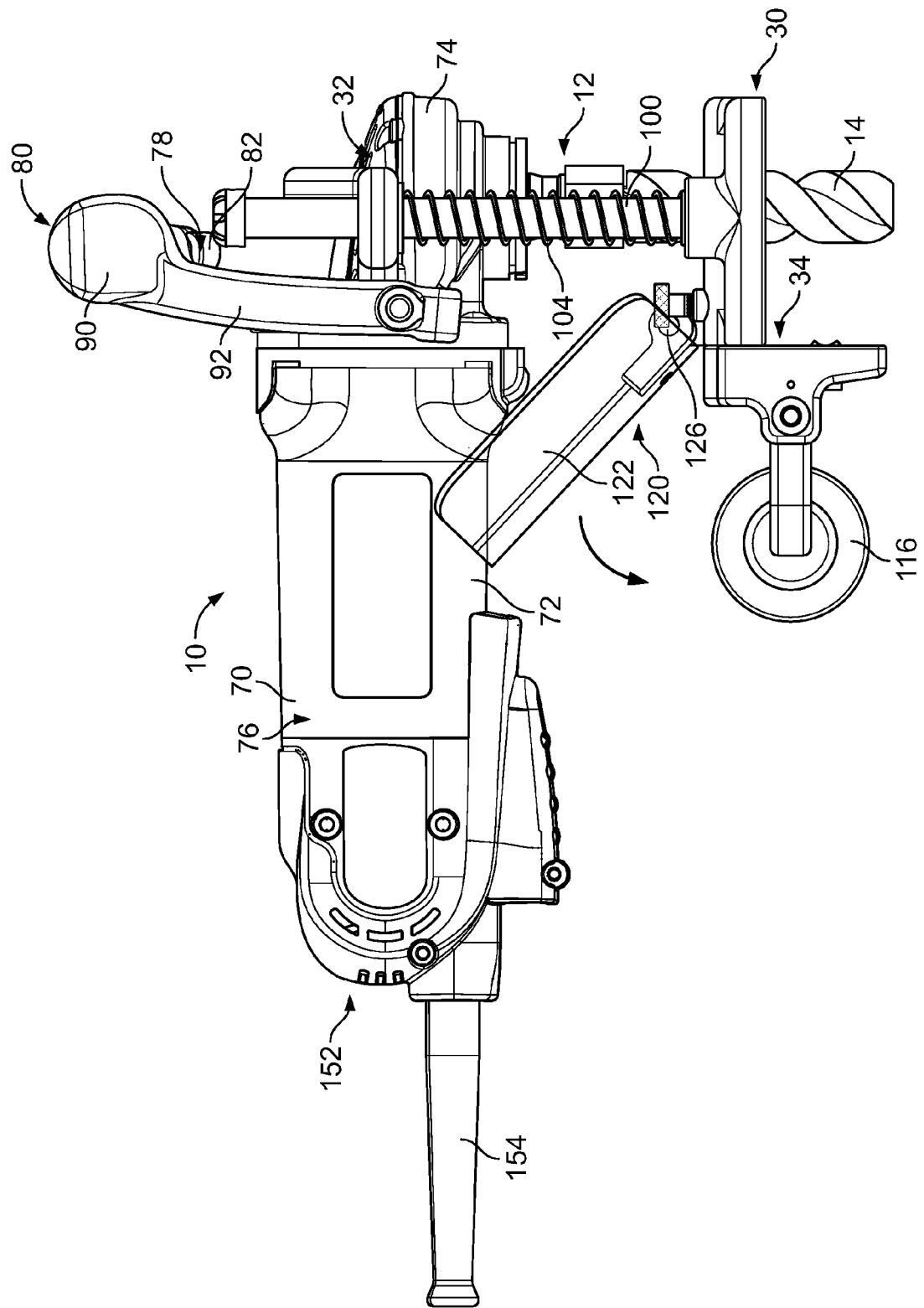
FIG. 3 is a side view of the joist drill of FIG. 1 showing a carriage assembly in a partially retracted condition in accordance with the present teachings.

With regard to FIGS. 1, 2 and 3, a guard assembly 120 can have a guard member 122 that can be pivotally attached to the base member 30 of the carriage assembly 12. The guard member 122 can extend from the base member 30 toward the housing and pivot toward the base member 30 away from the fluted cutting member 14 when the carriage assembly 12 is moved from the extended condition to the retracted condition.

With reference to FIG. 1, the guard assembly 120 can include the guard member 122, a block member 124 and a pivot pin 126. The guard member 122 can be a curved portion of plastic. The guard member 122 can be transparent (wholly or partially).

The block member 124 can connect the guard member 122 to the base member 30 with the pivot pin 126 that can provide the pivotal movement of the guard member 122. The guard member 122 can have the curved shape to generally extend around the fluted cutting member 14 and block wood chips thrown therefrom. The block member 124 can have a face 130 (FIG. 4) with a curved shape complementary to the curved shape of the guard member 122. The guard member 122 can be secured to the face 130 with one or more fasteners 132.

In one example, a block member can be formed integrally with the guard member and secured for pivotal movement with the base member 30 with the pivot pin 126. In addition, a deflector member 134 can also be secured to the base member 30 with one or more fasteners 136. The deflector member 134 can further serve to block wood chips thrown from the fluted cutting member 14.

With reference to FIG. 3, the guard member 122 can be positioned to extend between the housing 70 and base member 30 in any of the positions between the extended condition and the retracted condition. More specifically, the guard assembly 120 can include a spring that can be associated with the block member 124 and the pivot pin 126. The spring can bias the guard member 122 into continuous contact with (or a position very close to) the housing 70 of the joist drill 10. In various examples, the guard member 122 can deflect, among other things, chips thrown from the fluted cutting member 14 at any of the positions of the carriage assembly 12 as the joist drill 10 moves toward the base member 30 between the extended and retracted conditions.

With reference to FIG. 1, a stop member 150 can extend from the housing 70 and receive the pivot pin 126 that can connect the guard member 122 to the housing 70 with the block member 124. The stop member 150 can also obstruct and can terminate the motion of the housing 70, as the joist drill 10 travels toward the base member 30 of the carriage assembly 12. The guard member can pivot toward the rear 152 of the housing near the cord protector 154 and away from the fluted cutting member 14, as the housing 70 of the joist drill 10 can contact the stop member 150. In addition to or in lieu of the spring associated with the pivot pin, one or more springs (not shown) can connect a top portion 156 of the guard member 122 to a portion of the base member 30. The one or more springs can be similarly configured to maintain the guard member 122 in continuous contact with the housing 70 of the joist drill 10.

The stop member 150 can be configured with a cylindrical shaped cylinder that can extend from the base member 30. The stop member 150 can have a rounded top 158. The stop member 150 can have a through hole 160 generally perpendicular to a longitudinal axis 162 of the stop member 150 that is generally perpendicular to a surface from which the stop member 150 extends.

With reference to FIG. 4, the joist drill 10 can be used to cut through stacked up stud lumber 170 that is typically too thick to be cut through when only drilling from one side. In this instance, the joist drill 10 can form the hole 18 on a first face 172 of a first stud 174 in the stack 170 (e.g., a header by a window or doorway). Thereafter, the joist drill 10 can be aligned to drill another hole on a second face 176 of a second stud 178 on an opposite end of the stack 170. When drilling on the second stud 178 is complete, the joist drill 10 can form the hole in the second face 176 of the second stud 178 that is generally coaxial with the hole formed on the first face 172 of the first stud 174 in the stack 170. In one example, the joist drill 10 can create a hole with a depth of about three and three-eighths inches (about 85.7 millimeters), which in some situations can necessitate drilling through the stack 170 from both faces 172, 176.

With reference to FIGS. 2 and 4, the carriage assembly 12 can include a marking member 190 (FIG. 2) that can make a mark 192 (FIG. 4) on the first stud 174 and/or the second stud 178 (e.g., with a suitable witness mark) of the stack 170. For example, the marking member 190 can be on the fence member 34 so when the base member 30 is placed on the second stud 174, for example, the mark 192 is left on a face 194 of the second stud 178. The face 194 being the face of the one and one half inch dimension in an example with a 2×4. When the joist drill 10 is moved to the second stud 178 on the opposite side of the stack 170, a position of the base member 30 on the second stud 178 can be based on the mark 192 from the marking member 190.

The marking member 190 can include, but is not limited to, one or more permanent markers, pens, pencils, inking stamps and/or one or more combinations thereof. The marking member 190 can also be a portion of metal that extends from the carriage assembly 12 to contact the first stud 174 when the joist drill 10 is in the retracted condition. By way of this example, the marking member can leave a mark in the form of a depression in the stud having a certain polygonal shape to assist with alignment of the joist tool 10.

In one example and with reference to FIG. 4, a laser line generator 200 can be implemented with the joist drill 10 to project a laser line 202 along the stack of stud lumber 170 in which the hole 18 is being cut. The laser generator 200 can project the laser line 202 across the stacked lumber 170 to line up with the mark 192 on the first stud 174 so the joist drill 10 can be more readily positioned on the second stud 178 to cut the coaxial hole 18 through the stacked lumber 170. In the above example, the laser line 202 is generally in line with the fluted cutting member 14 so that the visual cue of the laser line 202 can represent the hole to be cut through a single stud, the stack 170 or spaced apart studs (e.g., joists).

In another example, a laser line from a laser generator can be offset from a line of cutting action of a cutting member. In this regard, the user can set a predetermined offset distance between the laser line and the line of action of the cutting member. The offset can also be fixed and therefore not adjustable.

In an application where multiple studs are being cut with typical spacing between the studs (e.g., a ceiling full of joists), the joist drill can cut a hole in a first stud and leave a mark on the first stud. The joist drill can then be moved to a second joist and the laser line can be aligned with the mark on the first joist. Because of the offset between the cutting member and the laser line, as discussed above, the hole cut on the second stud can be offset from the hole on the first stud. This process can be repeated so that what is being drawn through the studs, in the example of ceiling joists, can translate down the length of the studs and thus move diagonally along the ceiling.

Figure 6:
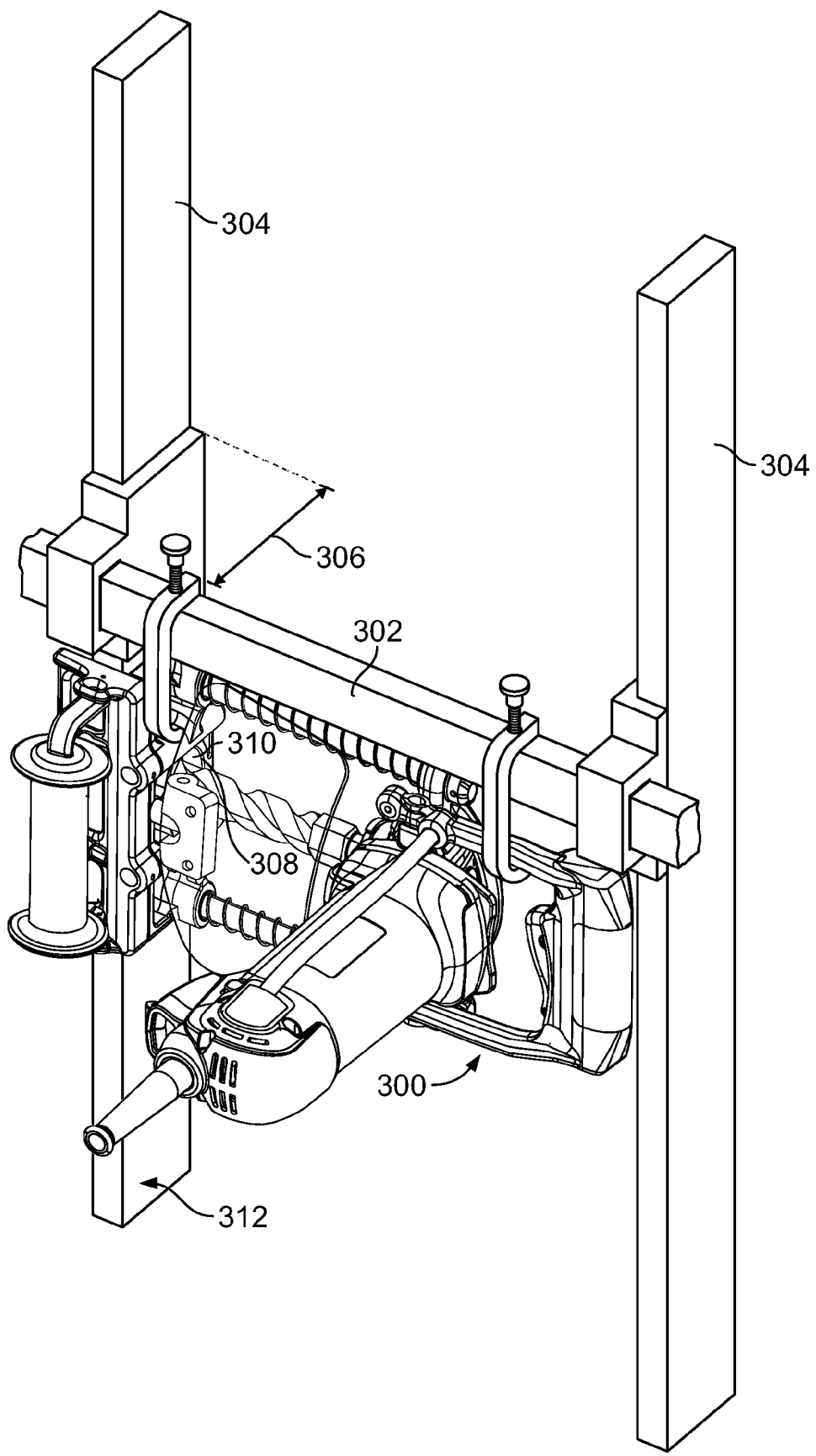
FIG. 6 is a perspective view of a joist drill removably coupled to a rail provided above multiple studs in accordance with the present teachings.

With reference to FIG. 6, a joist drill 300 can be secured to a track 302 that is attached to consecutive studs 304. The joist drill 300 can be moved along the track 302 and positioned above each of the selected studs 304. Because the track 302 can be secured at a fixed dimension 306 above the studs 304, the joist drill 300 at each of the studs 304 can drill a hole 308 at a fixed position on one of the studs 304 due to the configuration of the track 302, e.g., a center 310 of a face 312 of one of the studs 304. In other aspects, a track can be secured to studs 304 at a fixed non-zero slope to vary the position of the holes on the consecutive studs. Moreover, a track can have a custom and predetermined shape to provide holes at different pre-assigned locations on the studs.

In another example, an abutting member can be connected to the joist drill 300 in lieu of the track 302. The abutting member can be used to identify and set a distance from the cutting member to a surface to position the hole 308 in the center 310 of one of the studs 304. By contacting the surface, the joist drill 300 can be repeatedly placed against the surface (e.g., floor boards) and be positioned to cut the hole 18 in each of the studs 304 at the same desired position. In this regard, holes 18 formed in consecutive studs 304 can be generally coaxial to facilitate the pulling of wire, pipe or tubing. In one example, the abutting member can include a rod that runs through a base connected to a housing of the joist drill 300. The base can include a screw, one or more other fasteners and/or one or more clamps that can fix the rod to the base to provide the repeatable distance.

Figure 7:
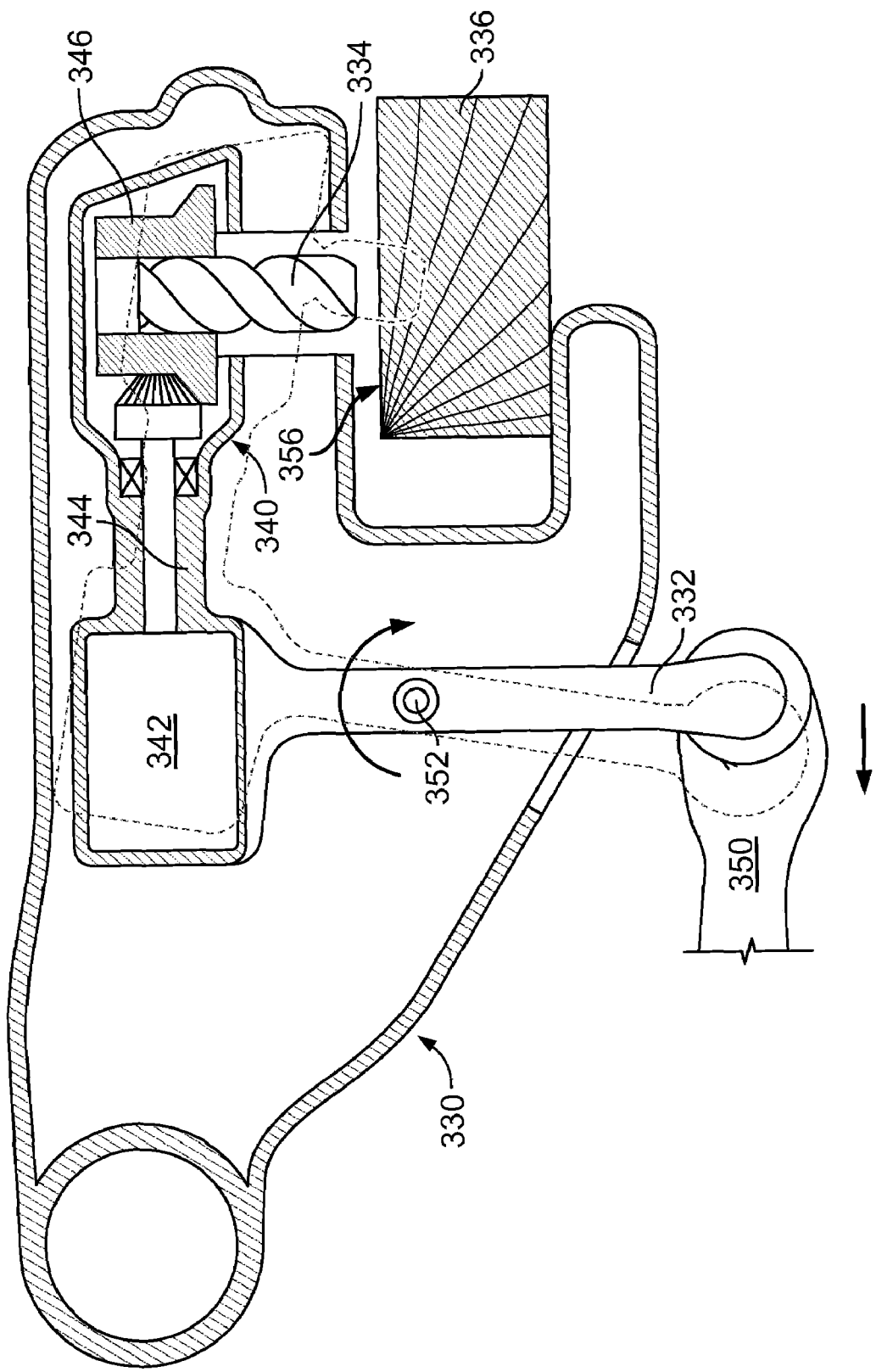
FIG. 7 is a diagram of a simplified cross-section of a joist drill having a handle that can be used to pivot the drive mechanism and advance the cutting member in accordance with the present teachings.

With reference to FIG. 7, a diagram of a joist drill 330 can include an external handle 332 (or lever) that can be used to advance a cutting member 334 into a stud 336. The joist drill 330 can be directly clamped to the stud 336 or connected to the track 302, etc. Movement of the external handle 332 can cause the cutting member 334 to advance into the stud 336. More specifically, a drive mechanism 340 can include a motor 342 and an output shaft 344 that can be rotated by the motor 342. The drive mechanism 340 can also include an output spindle 346 driven by the output shaft 344 and a coupling mechanism 348 that connects the cutting member 334 to the output spindle 346.

When the external handle 332 is pulled by a user 350, the drive mechanism 340 pivots about a single pivot point 352 to move the drive mechanism 340 and advance the cutting member 334 into the stud 336. It will be appreciated in light of the disclosure that the cutting member 334 can advance into the stud 336 at an angle 354 that is not perpendicular to a face 356 of the stud 336. Nevertheless, a hole made by the cutting member 334 can be sufficient to pull electrical wire or plumbing materials.

An amount of movement of the external handle 332 is proportional to an amount of movement of the drive mechanism 340. The single pivot point 352 can be positioned to adjust the magnitude of travel of the external handle 332 and the drive mechanism 340. In this regard, the amount of movement of the external handle 332 can be reduced but still provide enough movement to advance the cutting member 334 into the stud 336.

Figure 8:
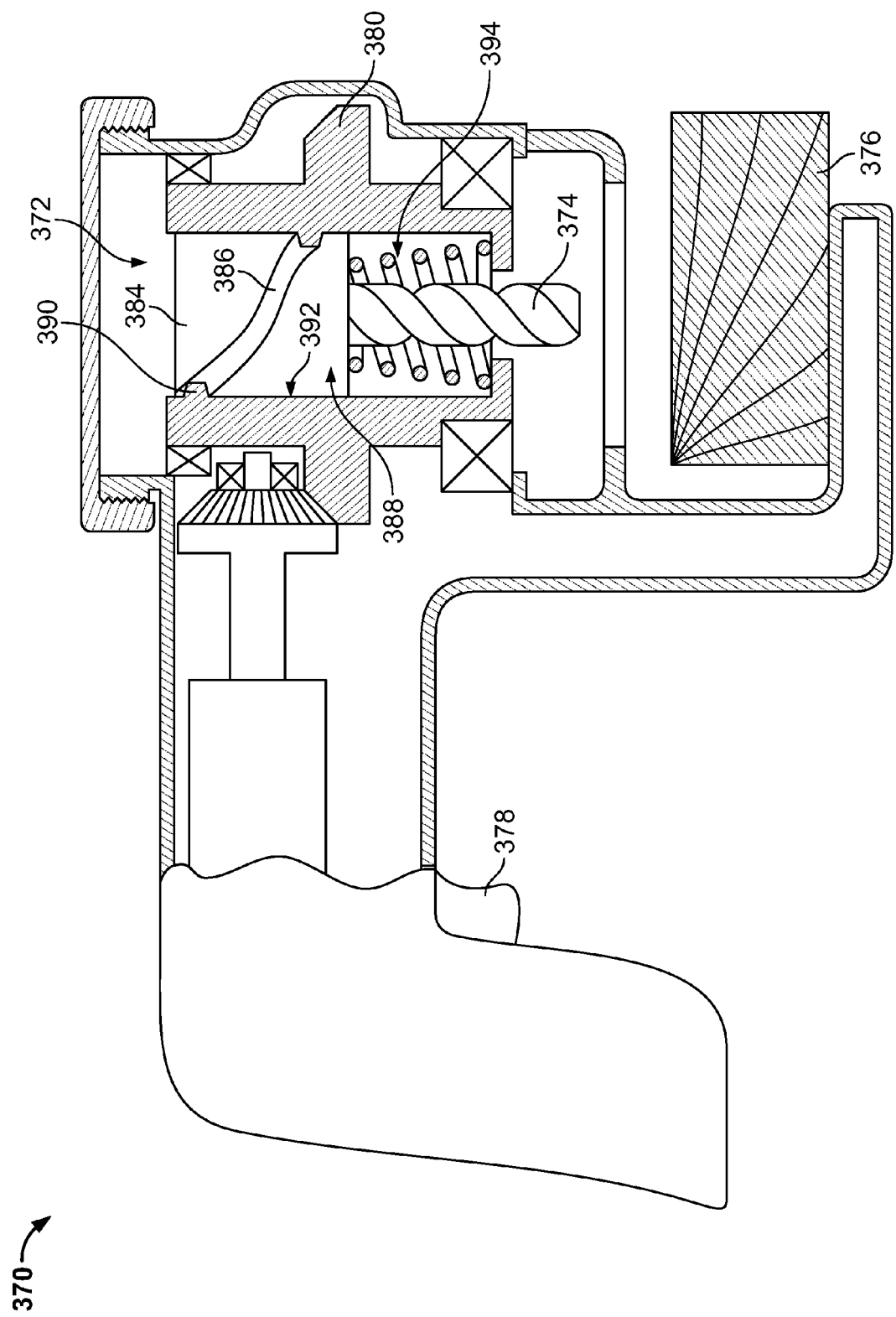
FIG. 8 is a diagram of a simplified cross-section of a joist drill that advances the cutting member with a bendix mechanism in accordance with the present teachings.

With reference to FIG. 8, a diagram of a joist drill 370 shows a bendix mechanism 372 to advance a cutting member 374 into a stud 376. The joist drill 370 can be directly clamped to the stud 376, a track, etc. Retracting a trigger 378 (or lever), can cause an output spindle 380 to rotate causing the bendix mechanism 372 to advance and rotate the cutting member 374 into the stud 376.

More specifically, the bendix mechanism 372 can permit the automatic advance of the cutting member 374 once a motor 382 powers the output spindle 380. An accessory carrier 384 can have a helical groove 386 (or rib) in its outer surface 388. The outer surface 388 can mate with a corresponding helical rib 390 (or groove) in an interior surface 392 of an inner periphery 394 of the output spindle 380. As the output spindle 380 can be rotated by the motor 382 and any resistance to rotation of the accessory carrier 384 (e.g., due to inertia, drive friction and/or cutting load) can cause the accessory carrier 384 to advance along the helical groove 386. After the motor 382 is turned off, a return spring 396 (or solenoid) retracts the accessory carrier 384.

Figure 9:
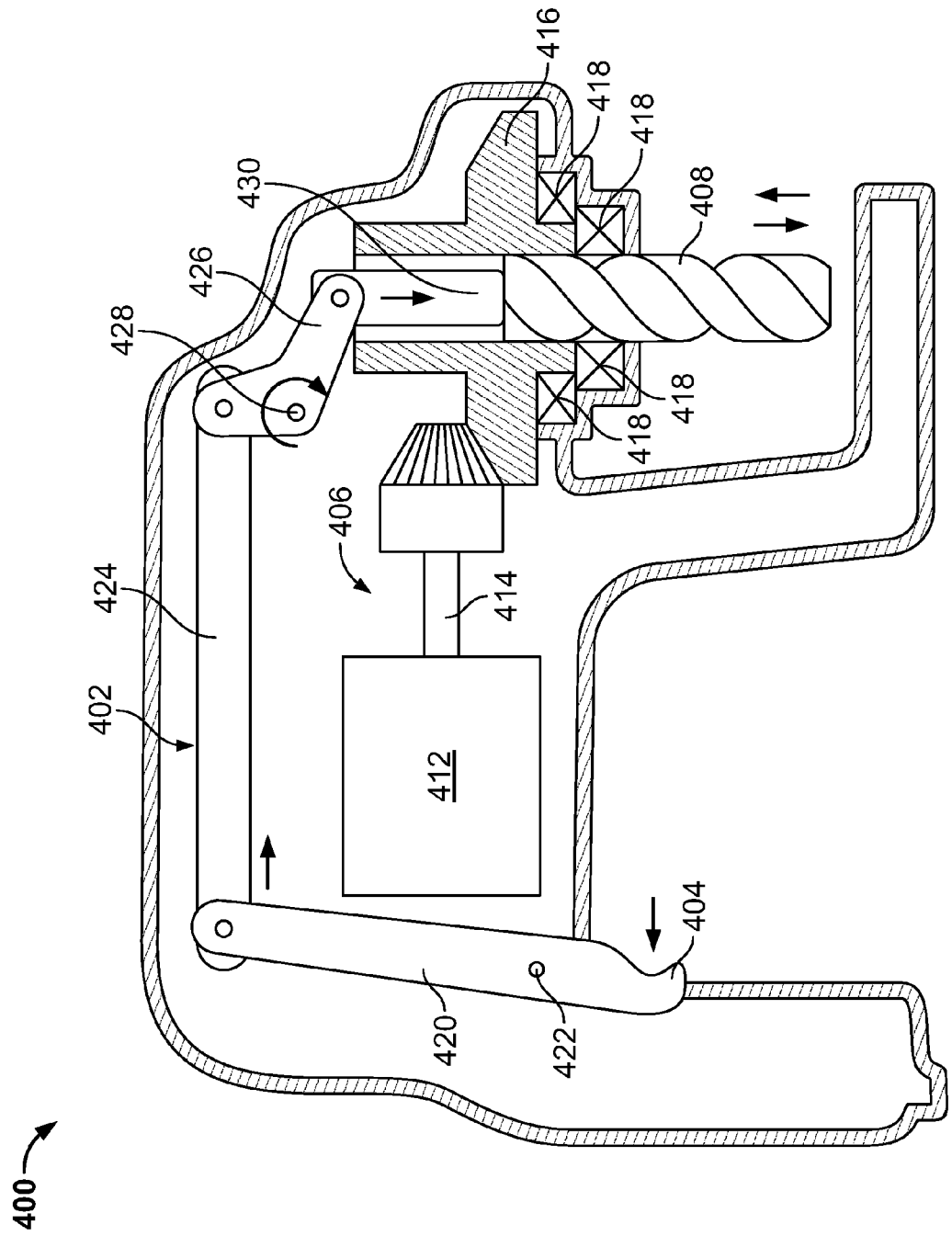
FIG. 9 is a diagram of a simplified cross-section of a joist drill that advances the cutting member with a pusher member that is moved by actuating a linkage between the trigger and the cutting member in accordance with the present teachings.

With reference to FIG. 9, a diagram of a joist drill 400 that includes a linkage 402 between a trigger 404 and a drive mechanism 406 that rotates a cutting member 408. By retracting (pulling) the trigger 404, the linkage 402 between the trigger 404 and the drive mechanism 406 can advance the cutting member 408 within the drive mechanism 406 so the cutting member 408 is advanced into a stud. More specifically, the drive mechanism 406 can include a motor 412, an output shaft 414 rotated by the motor 412 and an output spindle 416 driven by the output shaft 414. The cutting member 408 can be connected to the output spindle 416. The joist drill 400 can include bearings 418 that can permit the output spindle 416 to hold and rotate (drive) the cutting member 408 but also permit the cutting member 408 to translate within the output spindle 416 when urged by the linkage 402 connected to the trigger 404.

The linkage 402 can include the trigger 404 that can be connected to (or integral with) a trigger lever 420 that pivots about a first pivot point 422. The trigger lever 420 pivotally connects to a link member 424. The link member 424 can pivotally connect to an angle member 426 that can pivot about a second pivot point 428. The angle member 426 can be pivotally connected to a pusher member 430. By pulling the trigger 404 and thus moving the trigger lever 420, the link member 424 can be moved and can rotate the angle member 426 about the second pivot point 428.

As the angle member 426 rotates about the second pivot point 428, the angle member 426 can urge the pusher member 430 into contact with the cutting member 408 to advance the cutting member 408 into the stud 410. It will be appreciated in light of the disclosure that the linkage 402 can multiply the movement of the trigger lever 420 so that the distance moved by the trigger 404 can result in sufficient movement of the pusher member 430 to advance the cutting member 408 in the output spindle 416. The trigger 404 or the trigger lever 420 can be configured to also activate the motor 412.

With reference to FIG. 10 a diagram of a joist drill 450 can include a pivot 452 between a housing 454 of the joist drill 450 and a base member 456 that can attach to a stud 458. By pivoting the housing 454 about the pivot 452, a cutting member 460 can be advanced into the stud 458. A user 460 can hold the base member 456 against the stud 458, while pivoting the joist drill 400 into cutting engagement with the workpiece.

Figure 11:
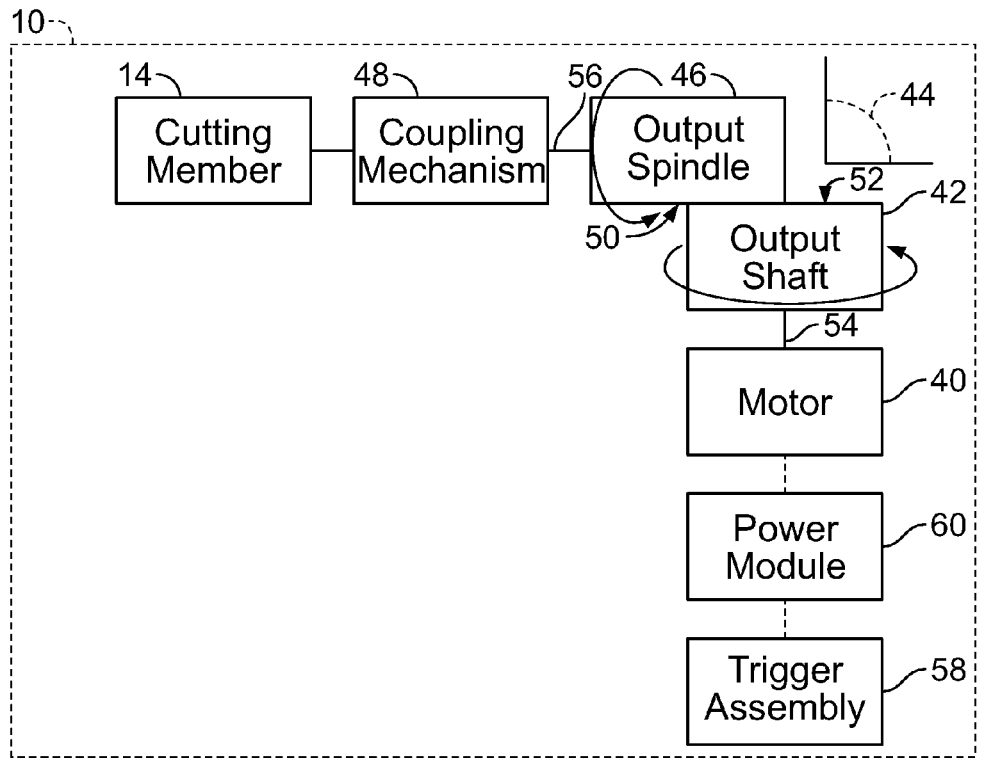
FIG. 11 is a diagram of the joist drill of FIG. 1 showing a motor having an output shaft and an output spindle connected to a cutting member with about a ninety degree angle between the output shaft and the output spindle in accordance with the present teachings.
Figure 12:
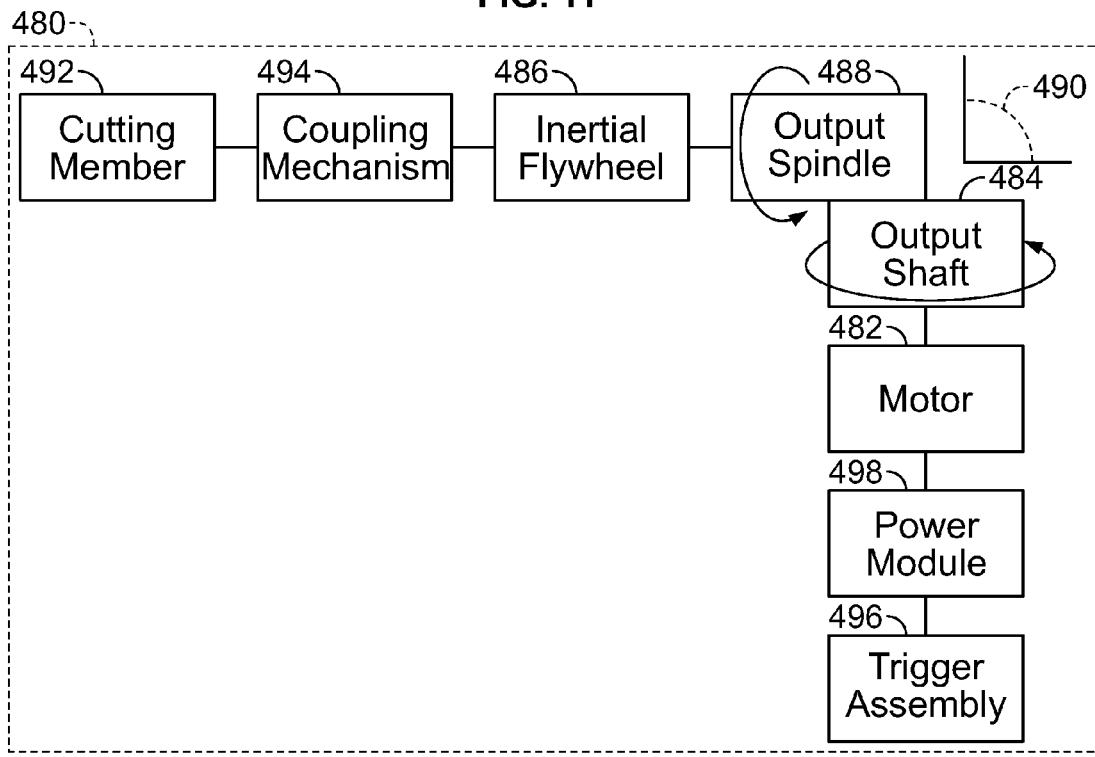
FIG. 12 is similar to FIG. 11 and shows an inertial flywheel that extends from the output spindle in accordance with the present teachings.

With reference to FIG. 11 and in one example, a diagram of the joist drill 480 can be shown with a motor 482 that can drive an output shaft 484. An inertial flywheel 486 can be connected to an output spindle 488 to maintain rotation of the output spindle 488 after the motor 482 has been deactivated. The output shaft 484 can connect at an angle 490 that forms a right angle to an output spindle 488. The output spindle 488 can connect to the fluted cutting member 492 with a coupling mechanism 494. As such, the motor 482 can drive the output spindle 488, and thus the fluted cutting member 492, at a predetermined rotational speed. The motor 482 can be activated by a trigger assembly 496 via a power module 498. The inertial flywheel 486 can maintain, at least for a while, a non-zero rotational speed of the output spindle 488 after the trigger assembly 496 is released.

In another aspect, a trigger assembly can be configured with a two position trigger. The first position can be a fully retracted position that activates a motor to turn a cutting member. The second position can be a partially retracted position that does not provide power to the motor but also does not engage an electric brake, i.e., using the motor to slow an output shaft. When the trigger is released, the electric brake can be engaged to slow the output shaft connected to the output spindle including the inertial flywheel.

In a further aspect, a clutch can be introduced between the inertial flywheel and the output spindle or the output shaft. The clutch can remain open when the inertial flywheel is spinning but zero rotation speed is desired at the output spindle. When the trigger is retracted, the clutch can couple the flywheel to the output spindle or output shaft to impart remaining kinetic energy thereon that otherwise need not be provided by the motor. Regardless of the implementation of the inertial flywheel 486, the power of the motor 482 can be reduced which can permit the size of the motor to be reduced.

Figure 13:
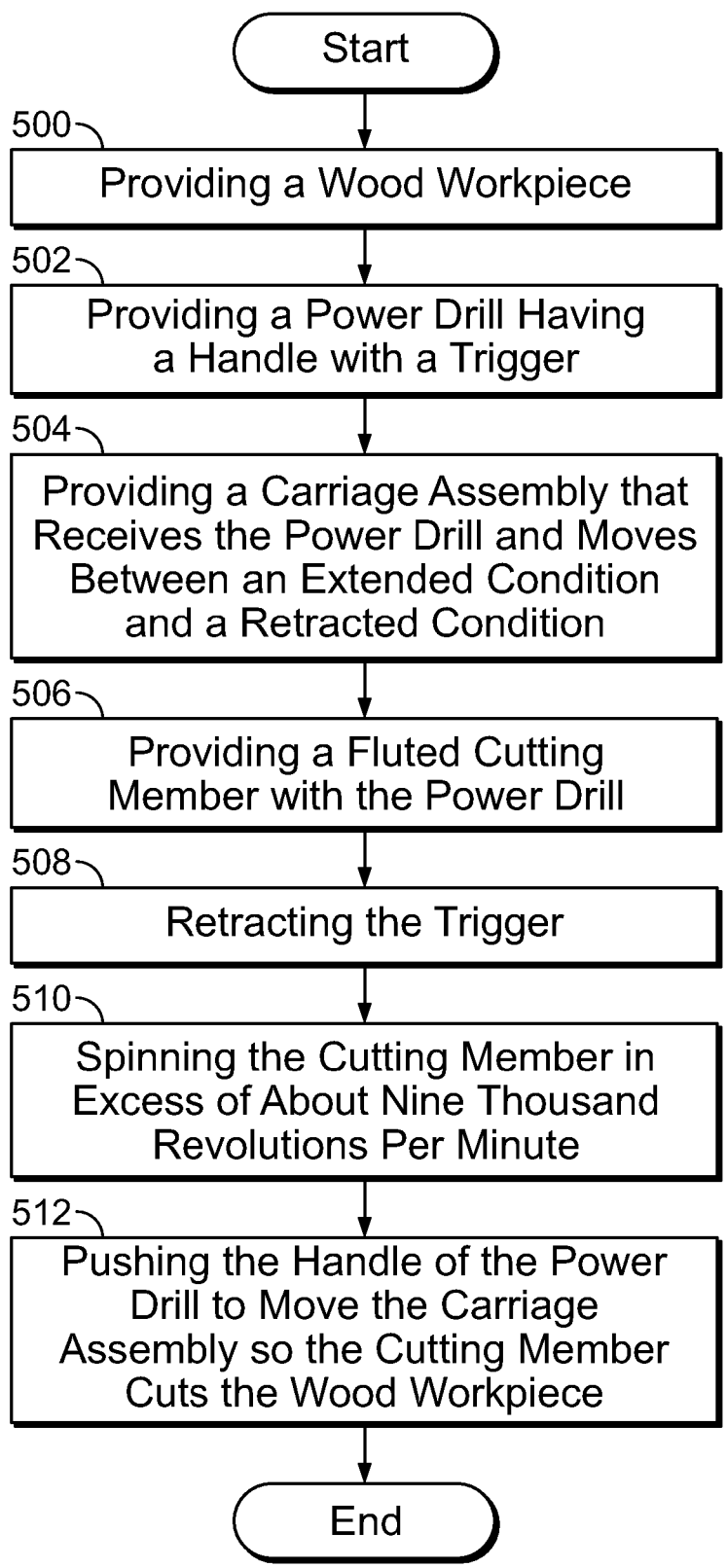
FIG. 13 is a flow chart illustrating an exemplary method of using the joist drill of FIG. 1 with a carriage assembly in accordance with the present teachings.

With reference to FIG. 13, an exemplary method of using the joist drill can begin with providing a wood workpiece in box 500. In box 502, a power drill can be provided with a handle and a trigger. In box 504, a carriage assembly that receives the power drill and moves between an extended condition and a retracted condition can be provided. In box 506, a fluted cutting member can be provided with the power drill. In box 508, the trigger can be retracted. In box 510, the cutter member can be rotated to a speed in excess of about nine thousand revolutions per minute. It will be appreciated in light of the disclosure that the optimized rotational speed can be dependant on the cutting diameter of the cutting member. In box 512, the handle of the power drill can be moved to move the carriage assembly into the retracted condition so the cutting member can cut the wood. From box 512, the method ends.

Figure 14:
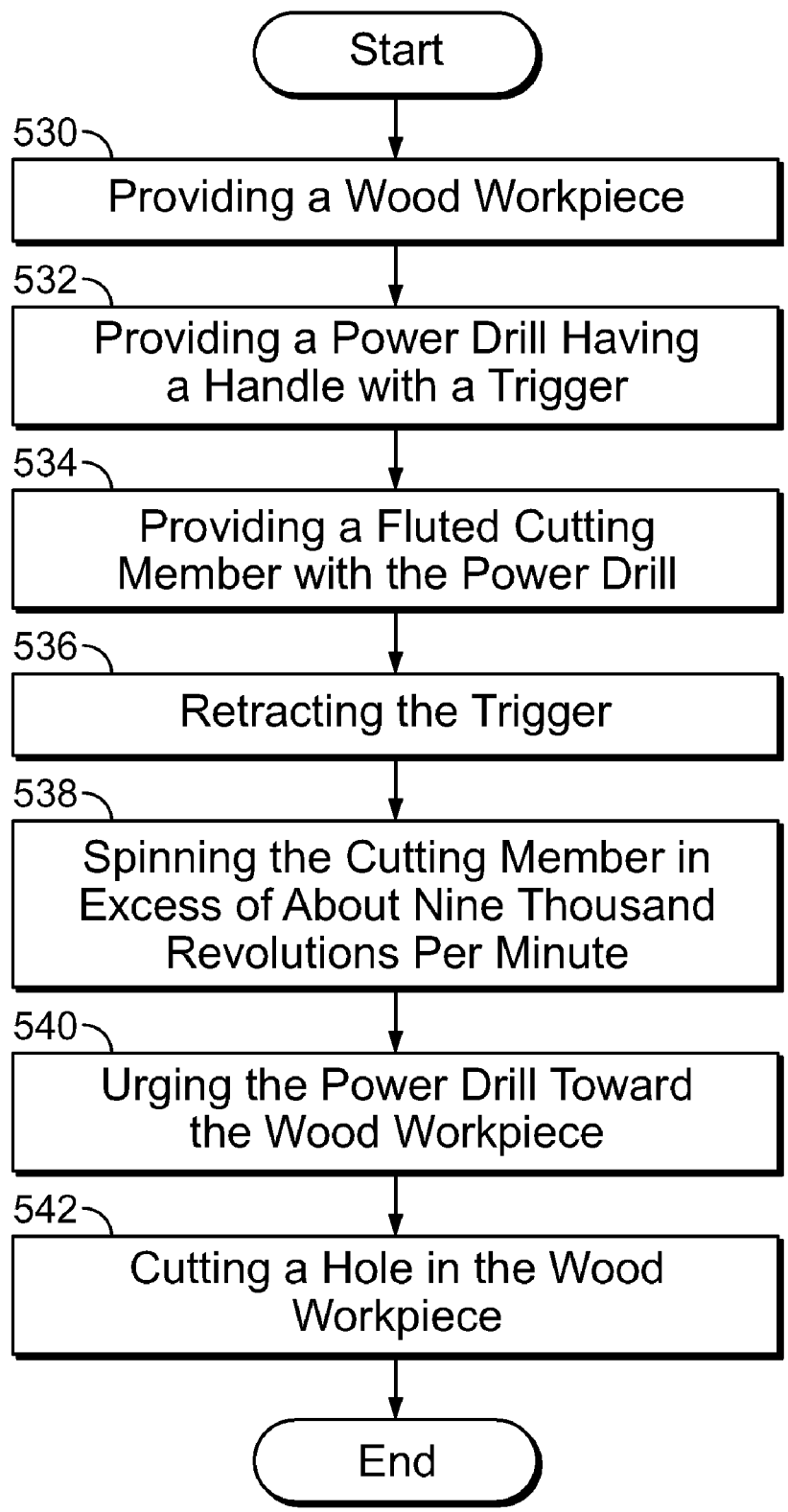
FIG. 14 is a flow chart illustrating use of the joist drill of FIG. 5 in accordance with the present teachings.

With reference to FIG. 14, an exemplary method of using the joist drill can begin with providing a wood workpiece in box 530. In box 532, a power drill can be provided with a handle having a trigger. In box 534, a fluted cutting member can be provided with the power drill. In box 536, the trigger can be retracted. In box 538, the cutting member can be driven at a rotational speed in excess of about nine thousand revolutions per minute. In one example, the rotational speed can be between about nine thousand revolutions per minute and eleven thousand revolutions per minute. In box 540, the power drill can be urged toward the wood workpiece. In box 542, the power drill can be used to cut a hole in the wood workpiece. From box 542, the method can end.

While specific examples have been described in the specification and illustrated in the drawings, it will be understood by those skilled in the art that various changes can be made and equivalents can be substituted for elements thereof without departing from the scope of the present teachings as defined in the claims. Furthermore, the mixing and matching of features, elements and/or functions between various examples can be expressly contemplated herein so that one skilled in the art would appreciate from the present teachings that features, elements and/or functions of one example can be incorporated into another example as appropriate, unless described otherwise above. Moreover, many modifications can be made to adapt a particular situation or material to the present teachings without departing from the essential scope thereof. Therefore, it can be intended that the present teachings not be limited to the particular examples illustrated by the drawings and described in the specification as the best mode presently contemplated for carrying out this invention, but that the scope of the present disclosure will include any aspects following within the foregoing description and the appended claims.

What is claimed is:

1. A power tool for drilling a hole in a workpiece made of wood or a wood material, the power tool comprising:
    a tool housing defining a handle;
    a motor contained within said tool housing that includes an output shaft that spins about a motor axis;
    a gear housing connected to said tool housing;
    an output spindle supported for rotation about a spindle axis in said gear housing, wherein said spindle axis is disposed about ninety degrees from said motor axis;
    a gear portion on said output shaft engaged to a gear portion on said output spindle, wherein said motor and said gear portions are configured to rotate said output spindle at a speed in range from about five thousand revolutions per minute to about twenty-five thousand revolutions per minute;
    a cutting member connected to said output spindle, wherein said cutting member includes fluted cutting blades;
    a carriage assembly including a base member and a head member connected by a first post having a first compliant member and a second post, wherein said head member slides relative to said first and second posts and against a force exerted by said first compliant member when said head member is moved toward said base member to pass said cutting member through said base member to engage the workpiece and wherein said base member includes a generally planar face on a bottom surface of said base member that is generally perpendicular to said spindle axis; and
    a chip guard member pivotally coupled to said base member, said chip guard member is biased into a position having generally continuous contact with said tool housing as said head member is moved toward said base member to pass said cutting member through said base member to engage the workpiece.

2. The power tool of claim 1 further comprising a fence member that can removably couple to said base member in at least one of a first position and a second position, wherein said fence member includes a generally planar face on a surface of said fence member that is adapted to abut the workpiece, wherein said generally planar face of said fence member is generally parallel to said spindle axis and wherein said first position of the said fence member is associated with a first size of dimensional lumber and said second position is associated with a second size of dimensional lumber.

3. The power tool of claim 1 further comprising a fence member fixed to said base member, wherein said fence member includes a generally planar face on a surface of said fence member that is adapted to abut the workpiece and wherein said generally planar face of said fence member is generally parallel to said spindle axis.

4. The power tool of claim 1, wherein said motor is activated when said head member travels beyond a predetermined location as said head member moves toward said base member to pass said cutting member through said base member to engage the workpiece.

5. The power tool of claim 1, wherein said motor and said gear portions are configured to rotate said output spindle at said speed in a preferred range from about nine thousand revolutions per minute to about eleven thousand revolutions per minute.

6. A power tool for drilling a hole in a workpiece made of wood or a wood material, the power tool comprising:
    a housing defining a handle and a trigger assembly;
    a motor contained with said housing that includes an output shaft that spins about a motor axis when a trigger of said trigger assembly is retracted;
    an output spindle supported for rotation about a spindle axis in said housing, said spindle axis is disposed about ninety degrees from said motor axis;
    a gear portion on said output shaft engaged to a gear portion on said output spindle, said motor and said gear portions are configured to rotate said output spindle at a speed in excess of about five thousand revolutions per minute;
a cutting member connected to said output spindle;
a chip guard member pivotally coupled to said base member, said chip guard member is biased into a position having generally continuous contact with said tool housing as said head member is moved toward said base member to pass said cutting member through said base member to engage the workpiece.

7. A power tool for drilling a hole in a workpiece made of wood or a wood material, the power tool comprising:
a housing defining a handle;
a motor contained with said housing that includes an output shaft that spins about a motor axis;
an output spindle supported for rotation about a spindle axis in said housing, wherein said output spindle is engaged with said output shaft and wherein said spindle axis is non-parallel to said motor axis;
a cutting member connected to said output spindle, wherein said cutting member includes fluted cutting blades and wherein said cutting member is rotated at a speed in range from about five thousand revolutions per minute to about twenty-five thousand revolutions per minute;
a carriage assembly including a base member and a head member, wherein said head member moves against a force exerted by a first compliant member when said head member is moved toward said base member to pass said cutting member through said base member to engage the workpiece and wherein said base member includes a generally planar face on a bottom surface of said base member that is generally perpendicular to said spindle axis;
a chip guard member pivotally coupled to said base member, wherein said chip guard member is biased into a position having generally continuous contact with said housing as said head member is moved toward said base member to pass said cutting member through said base member to engage the workpiece.

8. The power tool of claim 7 further comprising a fence member that can removably couple to said base member in at least one of a first position and a second position, wherein said fence member includes a generally planar face on a surface of said fence member that is adapted to abut the workpiece, wherein said generally planar face of said fence member is generally parallel to said spindle axis and wherein said first position of the said fence member is associated with a first size of dimensional lumber and said second position is associated with a second size of dimensional lumber.

9. The power tool of claim 7, wherein said motor is activated when said head member travels beyond a predetermined location as said head member moves toward said base member to pass said cutting member through said base member to engage the workpiece.

10. The power tool of claim 7, wherein said cutting member rotates at said speed in a preferred range from about nine thousand revolutions per minute to about eleven thousand revolutions per minute.

11. The power tool of claim 7, wherein said output spindle and said output shaft connect to one another with a bevel gear arrangement that orients said spindle axis at about ninety degrees to said motor axis.

12. A power tool for drilling a hole in a workpiece made of wood or a wood material, the power tool comprising:
a housing defining a handle and a trigger assembly;
a drive mechanism that includes a motor contained within said housing that rotates an output shaft about a motor axis and an output spindle supported for rotation about a spindle axis in said housing that connects to said output shaft, wherein said spindle axis is non-parallel with said motor axis and wherein said output spindle is configured to rotate at a speed in a range from about nine thousand revolutions per minute to about eleven thousand revolutions per minute;
a cutting member connected to said output spindle, wherein said cutting member has fluted cutting blades; and
a lever that when moved advances said cutting member relative to said housing into said workpiece, said lever includes a handle that when moved pivots said drive mechanism within said housing to engage said cutting member with the workpiece.

13. The power tool of claim 12, wherein said lever includes a trigger that when retracted urges a linkage to drive a pusher member to advance said cutting member into engagement with the workpiece.

14. A method of cutting a hole in wood, the method comprising:
providing a joist drill having a handle with a trigger;
providing a carriage assembly that receives the joist drill, wherein the carriage assembly is movable between an extended condition and a retracted condition;
providing a fluted cutting member connected to the joist drill;
retracting the trigger to activate a motor to drive the fluted cutting member;
rotating the cutting member at a rotational speed having a value in excess of about nine thousand revolutions per minute;
urging the joist drill to move the carriage assembly from the extended condition to the retracted condition to engage the cutting member with the wood;
marking the wood with a mark from a marking member that makes the mark when the carriage assembly is moved into the retracted condition.

15. The method of claim 14 further comprising imparting a rotational force on the fluted cutting member with an inertial flywheel.

16. A power tool for drilling a hole in a workpiece made of wood or a wood material, the power tool comprising:
a housing defining a handle and a trigger assembly;
a drive mechanism that includes a motor contained within said housing that rotates an output shaft about a motor axis and an output spindle supported for rotation about a spindle axis in said housing that connects to said output shaft, said spindle axis is non-parallel with said motor axis and said output spindle is configured to rotate at a speed in a range from about nine thousand revolutions per minute to about eleven thousand revolutions per minute;
a cutting member connected to said output spindle, said cutting member has fluted cutting blades; and
a lever that when moved advances said cutting member relative to said housing into said workpiece, said lever includes a trigger that when retracted activates said motor to rotate said output spindle that engages a bendix mechanism to advance said cutting member into engagement with the workpiece.

17. The power tool of claim 16, wherein said lever includes a trigger that when retracted urges a linkage to drive a pusher member to advance said cutting member into engagement with the workpiece.

* * * * *

UNITED STATES PATENT AND TRADEMARK OFFICE
CERTIFICATE OF CORRECTION

| | | |
|---|---|---|
| PATENT NO. | : 7,708,505 B2 | Page 1 of 1 |
| APPLICATION NO. | : 11/868012 | |
| DATED | : May 4, 2010 | |
| INVENTOR(S) | : Robert J. Opsitos, Jr. et al. | |

It is certified that error appears in the above-identified patent and that said Letters Patent is hereby corrected as shown below:

Column 12,
Line 60, "with" should be -- within --.

Column 13,
Line 13, "with" should be -- within --.

Signed and Sealed this

Third Day of August, 2010

David J. Kappos
*Director of the United States Patent and Trademark Office*